(12) United States Patent
Giallorenzi et al.

(10) Patent No.: US 10,880,775 B2
(45) Date of Patent: Dec. 29, 2020

(54) CLOSED-LOOP TRANSMISSION RATE CONTROL

(71) Applicant: L3 Technologies, Inc., New York, NY (US)

(72) Inventors: Thomas R. Giallorenzi, Sandy, UT (US); Samuel C. Kingston, Salt Lake City, UT (US); Nicholas T. Yaskoff, Cottonwood Heights, UT (US); Radivoje Zarubica, Sandy, UT (US); Eric K. Hall, Salt Lake City, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 0 days.

(21) Appl. No.: 16/412,116

(22) Filed: May 14, 2019

(65) Prior Publication Data
US 2020/0367098 A1 Nov. 19, 2020

(51) Int. Cl.
| | |
|---|---|
| *H04B 5/00* | (2006.01) |
| *H04W 28/06* | (2009.01) |
| *H04W 52/24* | (2009.01) |
| *H04W 28/10* | (2009.01) |
| *H04B 17/336* | (2015.01) |

(52) U.S. Cl.
CPC .......... *H04W 28/06* (2013.01); *H04B 17/336* (2015.01); *H04W 28/10* (2013.01); *H04W 52/241* (2013.01)

(58) Field of Classification Search
CPC . H04W 52/146; H04W 52/24; H04W 52/346; H04W 52/343; H04W 52/241; H04W 16/18; H04W 52/243; H04W 24/02; H04W 16/02; H04B 7/185; H04B 7/18515; H04B 7/18513; H04B 7/18519; H04B 7/2041; H04B 7/18539
See application file for complete search history.

(56) References Cited

U.S. PATENT DOCUMENTS

| | | | |
|---|---|---|---|
| 5,604,730 A * | 2/1997 | Tiedemann, Jr. ... | H04W 52/146 370/252 |
| 2005/0020213 A1* | 1/2005 | Azman et al. ....... | H04L 1/0034 455/67.11 |

(Continued)

FOREIGN PATENT DOCUMENTS

| | | |
|---|---|---|
| WO | 20041010608 A2 | 1/2004 |
| WO | 20191051079 A1 | 3/2019 |

OTHER PUBLICATIONS

European Search Report and Search Opinion Received for EP Application No. 20156758.3, dated Aug. 28, 2020, 9 pages.

*Primary Examiner* — Jung Liu
(74) *Attorney, Agent, or Firm* — Workman Nydegger

(57) ABSTRACT

Transmitting a signal from a transmitter. A method includes identifying a threshold spectral flux density for a given physical location. The method further includes, as a result of identifying the threshold spectral flux density, transmitting a signal at a power level causing the signal to be below the spectral flux density at the given physical location, the signal being transmitted at a data rate. The method further includes receiving feedback from a receiver indicating the signal-to-noise ratio of the signal at the receiver. The method further includes adjusting the data rate of the signal based on the feedback. The method further includes continuing transmitting the signal at the adjusted data rate and power level.

20 Claims, 6 Drawing Sheets

(56) References Cited

U.S. PATENT DOCUMENTS

2013/0033989 A1    2/2013   Barbieri et al.
2015/0147959 A1*   5/2015   Ha .................... H04W 16/18
                                                                     455/13.1

* cited by examiner

CLOSED-LOOP TRANSMISSION RATE CONTROL

BACKGROUND

Background and Relevant Art

Communication systems propagate communication signals. For example, an electromagnetic communication system may transmit electromagnetic waves carrying data through free space to a receiver. The purpose of these systems is to transmit the signals to the receiver such that the receiver can receive and decode the data in the signals. However, it is often desirable for the signals to not be detectable by other entities than the intended receivers. In particular, it may be desirable to keep the signal from being detected, intercepted, decoded, or from being used to identify the location of the transmitter of the signal. In particular, detection implies that an adversary is able to recognize the existence of the transmission, which tips them off that something is going on. In response, the adversary may attempt to intercept and exploit the transmission. For example, they may try to disrupt the transmission. Alternatively or additionally, they may try to read the transmission. Alternatively or additionally, they may try to locate the source of the transmission. In any case, detection would lead to the communication system and potentially individuals associated with it being compromised.

One way to attempt to keep the signals from being detectable by other entities is to send signals using direct sequence spread spectrum (DSSS) as part of a CDMA system. For example, a transmitter may be configured to use a communication signal to modulate a pseudo-noise signal to create a DSSS signal. The pseudo-noise comprises a continuous sequence of pulses, where each pulse is referred to as a chip, and where the chip rate is the frequency of pulses. The chip rate is typically significantly higher than the symbol rate of the communication signal. This results in a signal that exists beneath the noise floor. In particular, the signal is a low probability of detection (LPD) signal that is not readily detectable without specialized detection circuitry and techniques.

Often, when signals cannot be decoded by a legitimate receiver, the sender will increase the power of the signal to increase the signal-to-noise ratio of the signal to allow the receiver to detect and decode the signal. An adversary may use this information to create a situation where the adversary can detect the signal. In particular, the adversary may use "Jam, Blank and Observe" detectors to attempt to detect the signals. A "Jam, Blank and Observe" detector sends a jamming signal, which typically causes a sender to increase signal power. The detector then blanks the jamming signal, and observes the signal being sent from the sender to the receiver at higher power before the sender has a chance to lower the power of the signal.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of transmitting a signal from a transmitter. The method includes identifying a threshold spectral flux density for a given physical location. The method further includes, as a result of identifying the threshold spectral flux density, transmitting a signal at a power level causing the signal to be below the spectral flux density at the given physical location, the signal being transmitted at a data rate. The method further includes receiving feedback from a receiver indicating the signal-to-noise ratio of the signal at the receiver. The method further includes adjusting the data rate of the signal based on the feedback. The method further includes continuing transmitting the signal at the adjusted data rate and power level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein use closed-loop rate control, with constant (or at least limited) power to increase signal-to-noise ratio for signals. This can be done, for example, to prevent signals from becoming detectable by an adversary.

Closed-loop rate control dynamically alters the rate of communication signals sent by a receiver in an attempt to properly balance the energy per bit received by a receiver to achieve some desired signal-to-noise ratio. This can be particularly useful in CDMA systems, when covertness is considered important. When the energy per bit perceived by the receiver is determined to deviate from a target level, the data rate of that channel is adjusted through feedback to the transmitter, thus keeping the power transmitted by the receiver constant (or at least below some predetermined threshold) while increasing the energy per bit by reducing the data rate. A "Jam, Blank and Observe" detector therefore is rendered ineffective, as a jamming signal by an adversary would simply result in a reduction of the data rate of the data signal being transmitted by the transmitter, rather than an increase in power for the data signal being transmitted by the transmitter. Thus, when the adversary blanked the jamming signal, the data signal would still not be detectable by the adversary.

Additionally, embodiments may be implemented where information about a transmitter's priorities and knowledge of the applications carried over communication links can be used to constrain the rate control algorithm to give preference to certain channels' rates over other channels.

Closed-loop rate control is a countermeasure that can be used to keep a communication link more covert on fading channels than is possible with closed-loop power control. Closed-loop rate and power control can be used together if desired to form a more comprehensive energy control function that operates with constraints not usually found in commercial systems.

Figure 1:
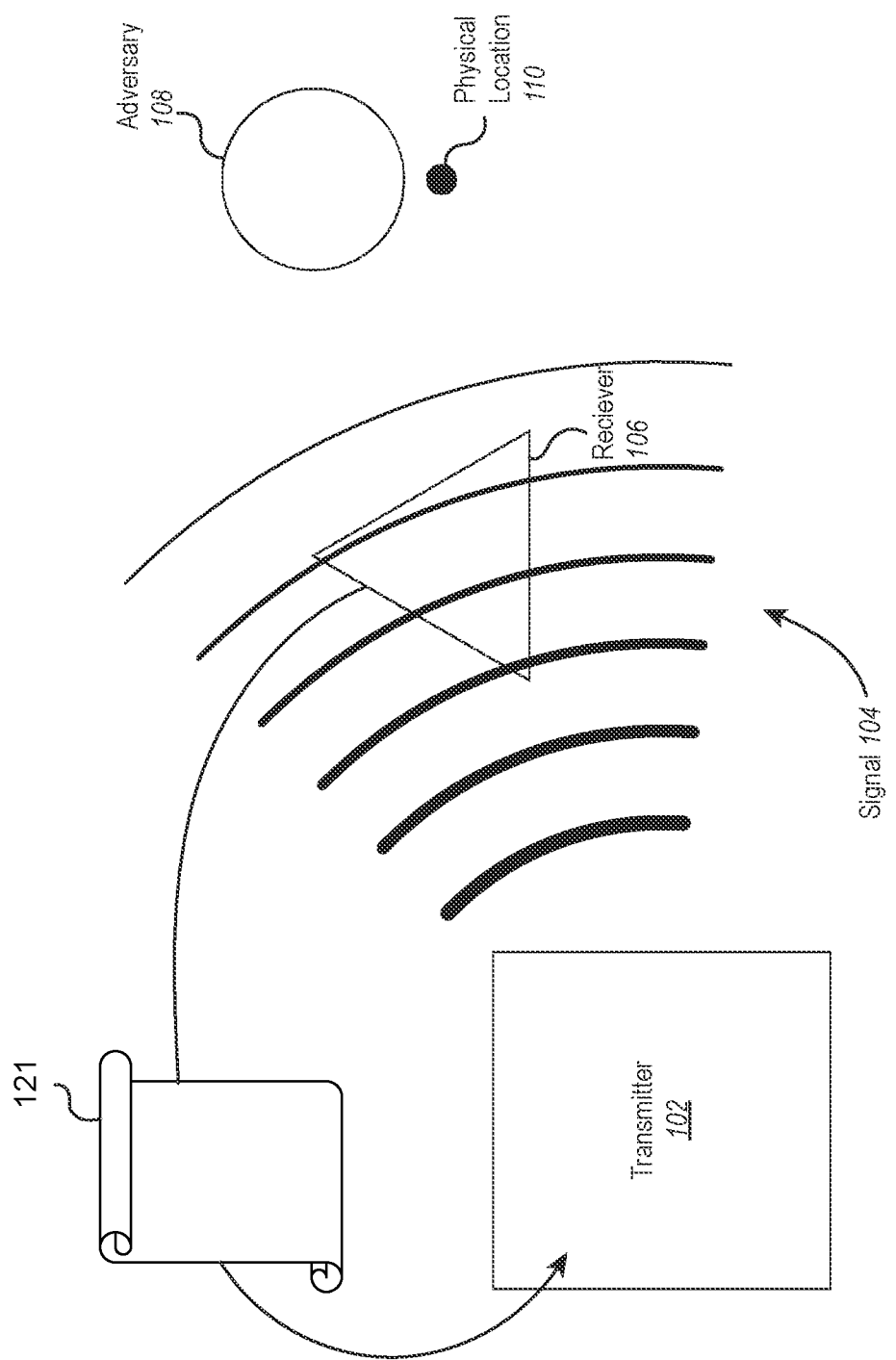
FIG. 1 illustrates a transmitter transmitting a signal to a receiver in a fashion to maintain a certain spectral flux density at a given physical location.

Referring now to FIG. 1, an example is illustrated of a point-to-point link in which it is desirable to keep the transmission covert (low probability of being detected—LPD). In particular, FIG. 1 illustrates an example where a transmitter 102 is sending a signal 104 intended for a receiver 106. As illustrated in FIG. 1, the signal 104 decreases in spectral flux density as the signal moves away from the transmitter 102. Spectral flux density defines a rate of electromagnetic radiation at a given physical location, and is typically measured in an amount of energy per surface area, per wavelength. Spectral flux density can be conceptualized as the amount of "power" for a given wavelength of a signal, at a given location. As systems attempt to manage spectral flux density, the system will need to manage the competing goals of having a sufficient spectral flux density for the receiver 106 to be able to receive and decode the signal 104 while preventing an adversary 108 at a physical location 110 from being able to detect the signal 104.

Note that the receiver 106 has the advantage of knowing the spreading codes used to transmit the signal 104 by the transmitter 102, such that the receiver 106 can despread the signal using appropriate codes, and thus the receiver 106 is able to recover the signal 104 even when the signal 104 is below the noise floor in an environment. That is, as the receiver 106 applies despreading codes, the signal 104 will become detectable to the receiver 106 as the despreading codes cause the signal to concentrate power over a narrower spectral bandwidth, causing the signal in that spectral bandwidth to be above the noise floor, and therefore detectable by the receiver 106.

In contrast, the adversary 108 at the physical location 110 will need to attempt to use specialized techniques to detect the signal below the noise floor, which would be very difficult if not impossible, or to cause the transmitter 102 to increase power of the signal 104 to cause the signal, even though spread by spread-spectrum, to be transmitted in a fashion that is more detectable by the adversary 108 at the physical location 110.

Thus, embodiments herein may attempt to transmit the signal 104 in a way such that the spectral flux density of the signal 104 remains below some predetermined threshold at a particular point. In particular, the transmitter 102 may have some information indicating that the adversary 108 exists at the physical location 110, or in proximity to the physical location 110. The transmitter 102 may then attempt to transmit the signal 104 such that the signal 104 is below a predetermined spectral flux density at the physical location 110. This threshold takes into account channel conditions, such as an ambient noise floor such as an average magnitude of the noise floor 114, and such that an increase in the magnitude of the noise floor will not increase the threshold spectral flux density for the signal 104 transmitted by the transmitter 102. That is, other noise whether caused by the adversary 108 or other sources, will not cause the transmitter 102 to increase the power of the signal 104 thereby increasing the spectral flux density of the signal 104 at the physical location 110.

Figure 2:
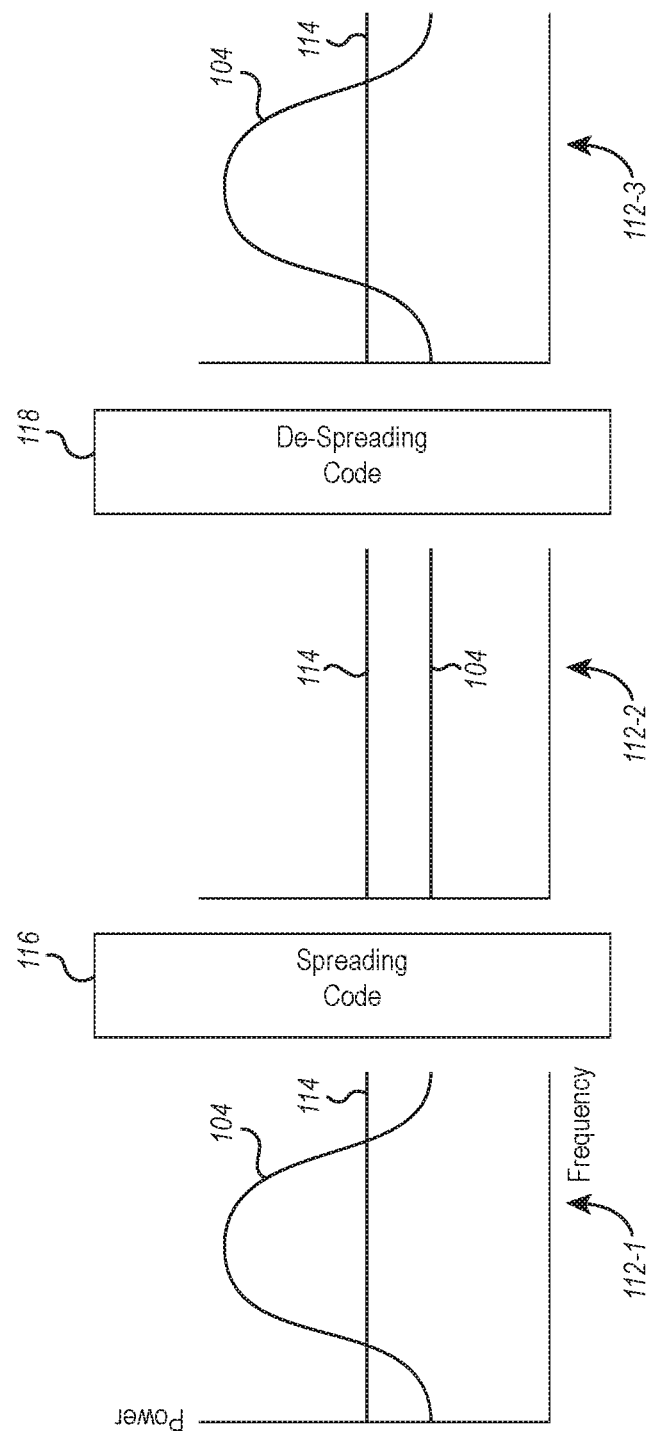
FIG. 2 illustrates a signal being spread by a transmitter and despread by a receiver.

For example, reference is now made to FIG. 2, which illustrates the signal 104 in a graph 112-1 showing the signal 104, graphing power versus frequency, with respect to the noise floor 114. When the signal 104 is first generated at the transmitter 102 or related circuitry, the signal 104 will be above the noise floor 114 and will be readily detectable by receivers or other entities. However, the transmitter 102 can apply spreading codes 116 to the signal 104 which causes the signal 104 to be spectrally spread such that the signal 104 exists below the noise floor 114 as illustrated in the graph 112-2. This is the state of the signal shown in FIG. 1 being perceived by the receiver 106 or adversary 108. That is, generally entities will not be able to detect the signal 104 as it will be below the noise floor 114 as illustrated at the graph 112-2.

However, the receiver 106 implements despreading codes 118, which cause the signal 104 to have a narrower spectral bandwidth causing signal power to be concentrated within a narrower range of frequencies, causing the signal power to be above the noise floor 114 as illustrated in the graph 112-3. Due to the fact that the receiver 106 is able to implement these despreading codes 118, the receiver 106 can then receive and decode the signal 104.

In contrast, the adversary 108 at the physical location 110 does not have the despreading codes, and thus does not have the ability to concentrate the power within a particular spectral bandwidth to be able to intercept the signal 104. That is, the adversary 108 will be in an environment with the signal 104 that is characterized by the signal power and noise floor 114 illustrated in the graph 112-2. Note that while the graph 112-2 shows the signal 104 below the noise floor 114, conditions may occur which cause the signal 104, even though the signal has been spread, to be above the noise floor 114. In particular, if the transmitter 102 sends the signal 104 with sufficient power, then the signal 104 may be above the noise floor 114 even though the signal has been spread. As noted previously, an adversary may attempt to elicit this behavior by attempting to jam the signal 104 by transmitting additional noise signals to decrease the signal-to-noise ratio with respect to the receiver 106 to attempt to cause the transmitter 102 to increase the signal power for the signal 104 in hopes that the signal 104 will be transmitted above the noise floor 114 when the adversary 108 blanks the jamming signal to reduce the noise floor.

Figure 3:
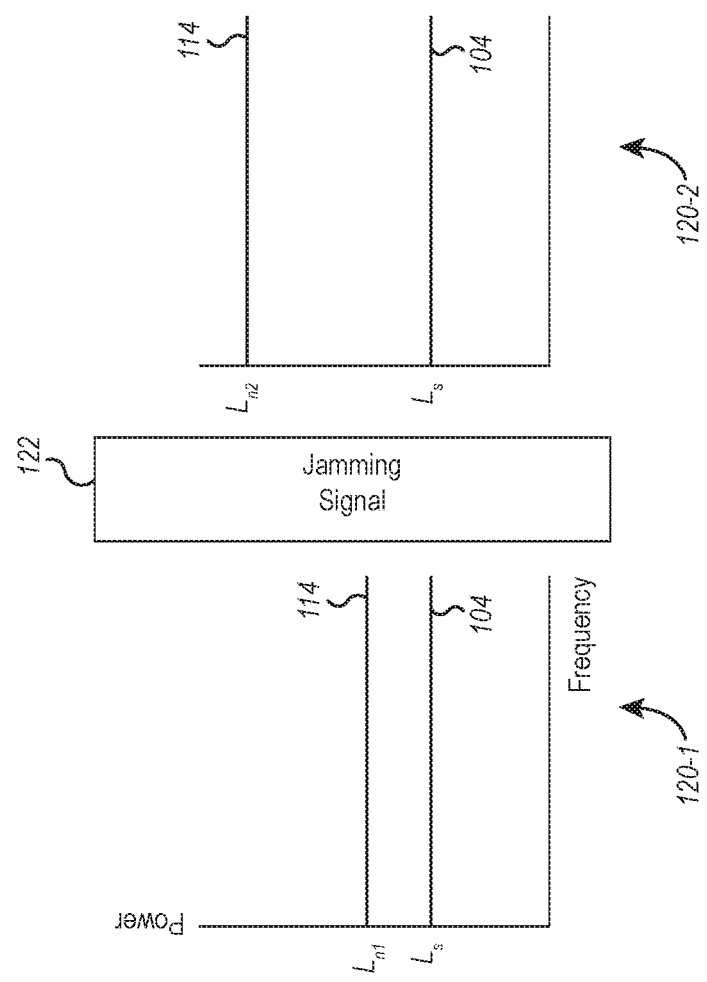
FIG. 3 illustrates the effects of a jamming signal on an environment.

For example, reference is now made to FIG. 3. FIG. 3 illustrates a graph 120-1. In the graph 120-1 the noise floor 114 is at a level $L_{n1}$. The signal 104 is at a level $L_S$. The adversary 108 begins transmitting a jamming signal 122. This causes the level of the noise floor 114 to be raised to level $L_{n2}$ as illustrated in the graph 120-2. However, the transmitter 102 will not respond with an increase in the power of the signal 104, but will rather maintain the signal 104 at the level $L_S$. Transmitting the signal at the level $L_S$ allows the signal to be transmitted such that a particular spectral flux density is achieved at the physical location 110. That spectral flux density will be the same whether the noise floor is at the level illustrated in the graph 120-1, or at the level illustrated in the graph 120-2.

However, to combat the increased noise from the jamming signal 122, the transmitter 102 may reduce the bit rate of the signal 104. This increases the power per bit of the signal 104 (thereby increasing the signal-to-noise ratio) by having fewer bits received by the receiver 106 per period of time with the same power. This results in a spectral flux density of the signal 104 that does not change at the physical location 110 even though the signal-to-noise ratio is increased with respect to the receiver 106. Thus, the transmitter 102 is able to transmit a signal 104 to the receiver 106 without making the signal 104 more visible by the adversary 108 at the physical location 110 as a result of the spectral flux density being constant, or at least below some predetermined threshold.

Referring again to FIG. 1, adjusting the bit rate of the signal 104 may be accomplished based on feedback communications between the transmitter 102 and the receiver 106. In particular, the transmitter 102 can send a signal 104 to the receiver 106. The receiver 106 can respond with a feedback message 121 that identifies to the transmitter 102 the signal-to-noise ratio of signals received by the receiver 106. The transmitter 102 can then adjust the bit rate of the signal 104 in response to the signal-to-noise ratio identified in the feedback message. This can include lowering the bit rate to increase the signal-to-noise ratio, or raising the bit rate if such actions can be performed and still be within a particular threshold signal-to-noise ratio indicated for the signal 104. Raising the bit rate allows more data to be transmitted per period of time.

On a fading channel, the communication propagation path to the communicator's receiver 106 and the propagation path to the adversary's detector near the physical location 110 will typically fade independently. Therefore, if closed-loop power control were to be used to keep the transmitter at a power level that is minimally sufficient to close the communicator's link (as was done previous to the present invention), then when the communicator's link fades, the power of the transmitter 102 will be turned up to compensate. Since the adversary's link is likely not faded at the same time, this will make the communicator more detectable by the adversary 108. Therefore, an appropriate countermeasure for this situation is to alter the rate rather than the power of the communicator's link. Then when the channel upfades, the rate of the link will go above average, and when the channel downfades, the rate of the link will drop below the average. As long as the feedback on the closed-loop rate control system is fast with respect to the channel coherence time, the loop will be able to keep up with the fading. The rate of the communication link on average will depend on the average channel path loss and the power transmitted by the transmitter 102. Note that if the average rate is insufficient, the power can be increased at the expense of covertness, but once the power is set based on a long-term average of the channel conditions, including, for the example, the average magnitude of the noise floor, the data rate is allowed to fluctuate as the short-term fading dictates.

Figure 4:
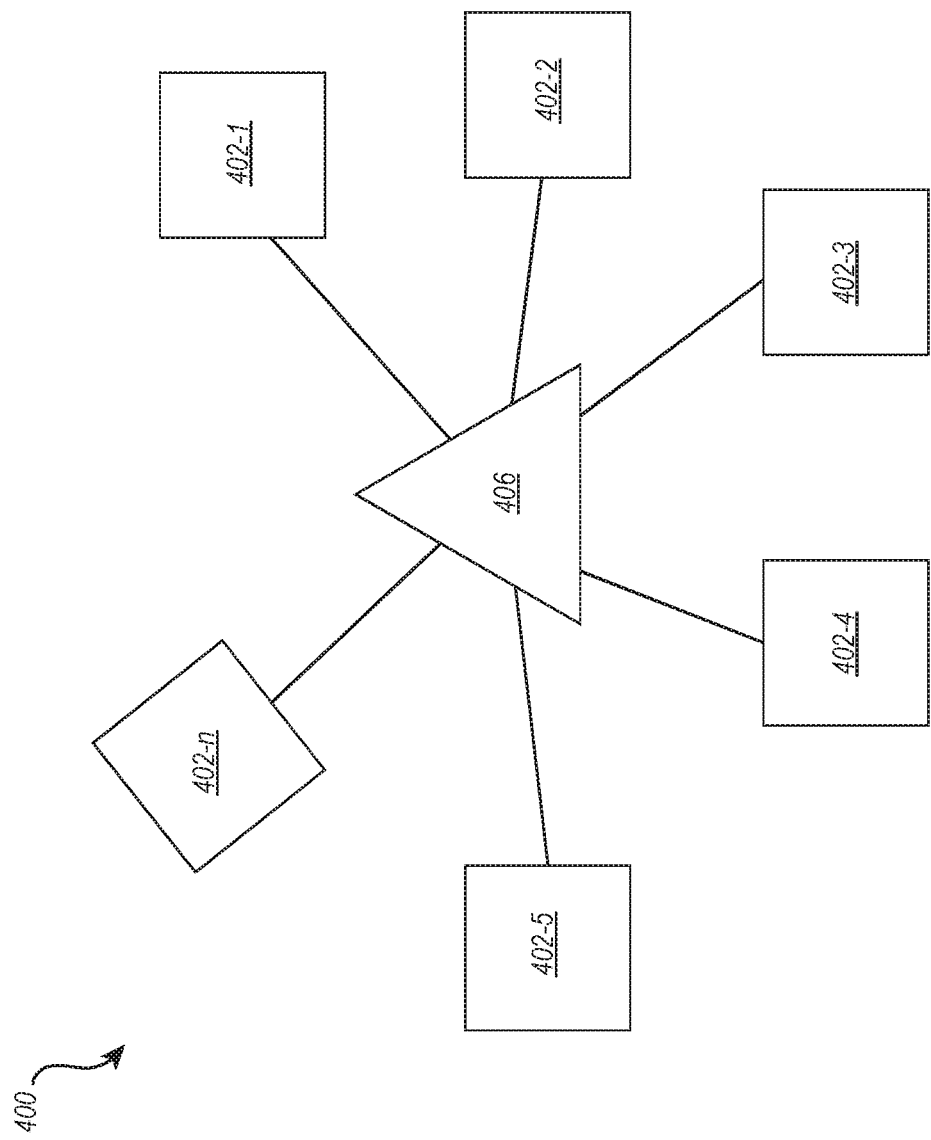
FIG. 4 illustrates a hub and spoke transmitter/receiver arrangement.

Referring now to FIG. 4, a star topology network 400 is illustrated, including a hub receiver 406, and a number of spoke transmitters 402-1 through **402-*n*. Closed-loop rate control is a way to dynamically alter the rate of each communication uplink in a star topology network 400 in an attempt to properly balance the energy per bit received by a hub receiver 406. This is important in CDMA systems, when covertness is considered important. When the energy per bit is perceived by the hub receiver 406 to be off from a target level, the data rate of that channel is adjusted through feedback to the spoke's transmitter (e.g., one of transmitters 402-1 through 402-*n***), thus keeping the power transmitted by the spoke constant. A "Jam, Blank and Observe" detector therefore is rendered ineffective. Finally, information about the transmitters' priorities and knowledge of the applications carried over the links can be used to constrain the rate control algorithm to give preference to certain channel's rates over other channels.

Closed-loop rate control is also a countermeasure that can be used to keep a single link more covert on fading channels than is possible with closed-loop power control. Closed-loop rate and power control can be used together if desired to form a more comprehensive energy control function that operates with constraints not usually found in commercial systems.

Most CDMA systems use closed-loop power control to balance the energy per bit received of the uplinks from the spokes to the hub. Also on fading channels, even point-to-point links often use power control to keep the transmitted power as low as possible when covertness is considered to be important. Instead, embodiments illustrated herein can dynamically alter the data rate of the communication link rather than the power. This keeps the power radiated constant (or at least below some predetermined threshold) and in some cases less observable as a result.

Thus, closed-loop Rate Control can be used to accomplish one or more of keeping the power of the transmitted signal constant or below a predetermined threshold, thus making it harder for an adversary to detect. It can be used to implement more covert operation on a fading channel. Alternatively, or additionally, it can render a "Jam, Blank and Observe" detector ineffective.

In an alternative example, closed-loop rate control can be used, for example, for a military CDMA star topology network, in which it is desirable to keep the spoke's uplink transmissions to the hub as covert as possible. Imagine first a traditional CDMA system that uses closed-loop power control. If an adversary wanted to find the transmissions of the spokes (assuming they were too quiet to be seen from the location of the adversary initially), then the adversary could jam the hub's uplink frequency with energy, thus lowering the SNR of all of the uplink transmissions. The spokes would therefore be turned up by power control to higher power levels. If the adversary then suddenly blanked the jamming transmitter and sniffed the spectrum for the spokes' transmissions, the adversary would be able to see the transmitters more easily because they were turned up to higher levels. In this way, the "Jam, Blank and Observe" detector is able to bait the spokes to raise their power levels up (perhaps above the noise floor of the adversary's detector) and then by suddenly ceasing the jamming, the adversary can detect the uplink transmissions before the power control loop turns their signals back down to the original level.

In contrast, embodiments can implement a CDMA system that uses closed-loop rate control instead. This system sets the powers of the users (e.g., spoke transmitters 402-1 through **402-*n*) at a minimally sufficient level to achieve the needed uplink rate under most circumstances. For example, the transmitters may be configured to transmit at a power level for a target SNR, assuming a known average (or minimum) noise floor. The hub receiver 406 alters the data rate of each uplink transmission, by indicating the SNR of signals received at the hub receiver 406** and/or directing data rate changes as appropriate, rather than the power transmitted when the uplink transmission energy per bit is deemed to be lower or higher than a target level. Now when a "Jam, Blank and Observe" detector is introduced by an adversary into the environment, the uplink jamming causes the data rates of the uplink channels to drop to lower levels, but the uplink powers remain unchanged. When the jammer ceases and observes the uplink spectrum, the adversary will not have succeeded in baiting any of the spokes into turning up their transmission power. The data rates would then rise back up under the control of the closed-loop rate control algorithm and the adversary would see no change in the noise floor.

Using aspects of this CDMA closed-loop rate control system, embodiments can be implemented which include quality of service and spoke priority. For example, if it is known by the hub that one user is sending a video uplink from a transmitter that requires, for example 384 kbps, and any rate below that will be insufficient, then the hub can use an all-or-nothing override on the rate control and lower other CDMA users using the transmitter that are employing more rate-flexible applications to favor the video uplink user, in an attempt to maintain this higher rate as long as possible.

Figure 5:
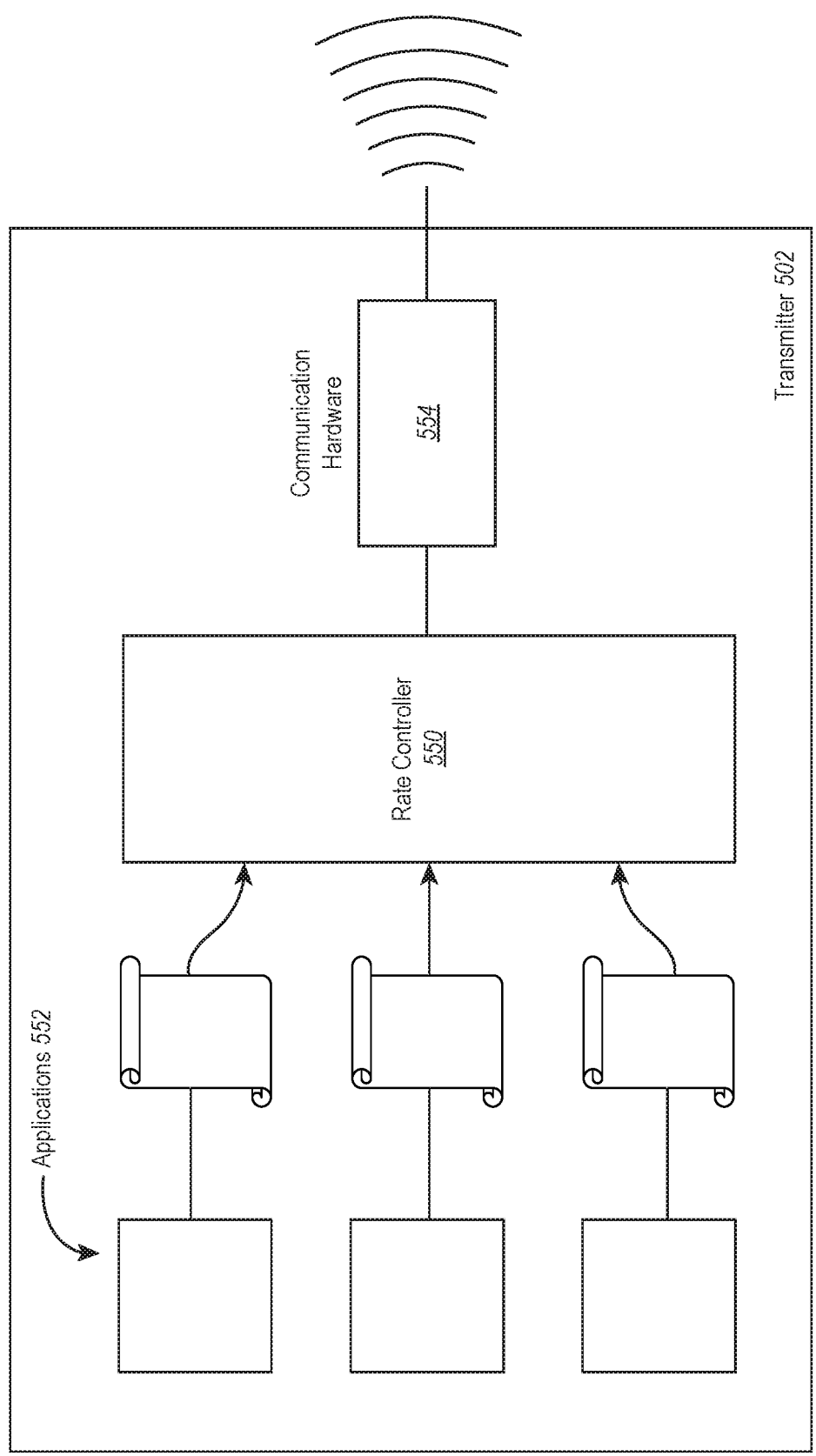
FIG. 5 illustrates additional details of a transmitter.

In some embodiments, other users are notified to turn off completely, temporarily (by having their bit rate lowered to zero or near zero), in an attempt to provide enough signal-to-interference-plus-jamming-plus-noise ratio to keep the video channel alive. In other words, in some embodiments, closed-loop rate control mechanisms are application-aware, such that they can give rate preference to rate-sensitive applications at the expense of rate-insensitive applications. For example, referring now to FIG. 5, some embodiments may include physical computer processors coupled to physical computer storage devices configured to store computer executable instructions which implement the closed-loop rate control mechanisms, such as the rate controller 550 illustrated in the transmitter 502. Alternatively, or additionally, the rate controller 550 may be implemented using other mechanisms such as hardware programmable devices, logical gates, and/or other combinations of hardware, firmware, and/or software. Embodiments may include instructions or other flow controls which allow applications 552 on a device such as the transmitter 502 to identify themselves and/or to identify a priority level of data being sent from the applications 552 to be transmitted using communication hardware 554.

The communication hardware 554 is connected to the rate controller 550 which allows the rate controller 552 to provide data to the communication hardware 554 to be transmitted to various receivers as illustrated previously herein. The communication hardware may include for example various filters, amplifiers, modulators, antennas, transmission lines, and other appropriate components to propagate data on an appropriate medium for reception by one or more receivers.

The rate controller 550 receives data from the applications 552 and regulates the rate at which that data is provided to the communication hardware 554 for transmission on a transmission media, such as over the air. The rate controller 550 can prioritize data received at the rate controller 550 in various ways. For example, the rate controller 550 may include a comparison process that compares information from the applications 552 identifying the applications. In particular, an application may send application data to be transmitted by the communication hardware 554 along with an indication of the applications sending the data to be transmitted. The rate controller 550 can determine a priority level for the application and can determine what data rate the data from the application will be provided to the communication hardware 554 for transmission on the transmission media.

In an alternative or additional example, the applications can provide data with an indication of the priority level of the data itself rather than simply an indication of the applications sending the data. In this case, the rate controller 550 may include an algorithmically implemented comparator that is able to receive the priority information from an application, identify an appropriate data rate for the stated priority, identify an available data rate bandwidth for communication on the communication hardware 554 to maintain an appropriate spectral flux density, and cause the data to be transmitted by the communication hardware 554 at a determined rate using the mechanisms described.

Embodiments may implement various contention resolution algorithms at the rate controller 550 when there is competition for bandwidth. For example, certain types of data may be known by the rate controller 550 to be mission-critical data, and will thus have priority over other data, even when the other data is also indicated as being high-priority data and/or from a high priority application. Alternatively or additionally, the rate controller 550 may include a process that determines that the data is intended for a particularly important recipient and can thereby cause data for that recipient to have priority over other data for transmission on the communication hardware 554.

Similarly, embodiments may be implemented where the CDMA closed-loop rate control algorithm is made aware of spoke priority levels, and can give rate preference to higher priority users at the expense of lower priority users.

It should be noted that embodiments setting the power levels of a set of transmitters that do rate control can also be implemented in some embodiments of the invention. Power levels are set in a way that keeps the transmissions as covert as possible, while maintaining a long-term average rate (averaged over fading, jamming, etc.) that is adequate to support the applications that the link needs to carry. In this sense, the CDMA closed-loop rate control algorithm can implement power control as well as rate control, and these two degrees of freedom can be managed together. For example, some embodiments may be configured to manage power based on the channel state over very long time periods, while managing rate over shorter time periods. Thus for example, in some embodiments power can be increased if it is determined that the noise floor has increased for a sufficiently long period of time as determined by comparison to some predetermined threshold, or other noise floor information. Alternatively, or additionally, power can be increased if it is known that additional noise raising the noise floor can be attributed to a source other than a jamming transmitter. For example, some embodiments may be able to determine an increase in the noise floor over a geographical area, and/or with characteristics that indicate that the noise floor is being raised due to some cause other than a jamming transmitter. For example, this could be due to cosmic radiation, weather conditions including lightning or other conditions, ignition systems, increased cellular traffic, solar flares, auroras, etc. embodiments may include the ability to gather information about one or more of these noise causing interference sources and to allow power to be increased when it is known that these noise sources are active. Indeed some embodiments may be able to determine a magnitude of noise attributable to an external noise source, and allow for an increase in power to increase the spectral flux density allowed corresponding to the increase in noise. Conversely, embodiments may be able to identify when noise sources are eliminated or reduced, and can therefore adjust the allowed spectral flux density accordingly. In these cases, it may be important to know the source of the noise to ensure that adjustments are not made for unknown noise that may be caused by adversarial jammers.

Note that embodiments illustrated herein may control spectral flux density to ensure one or more of low probability of interception (LPI), low probability of exploitation (LPE) or low probability of geolocation (LPG), etc.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
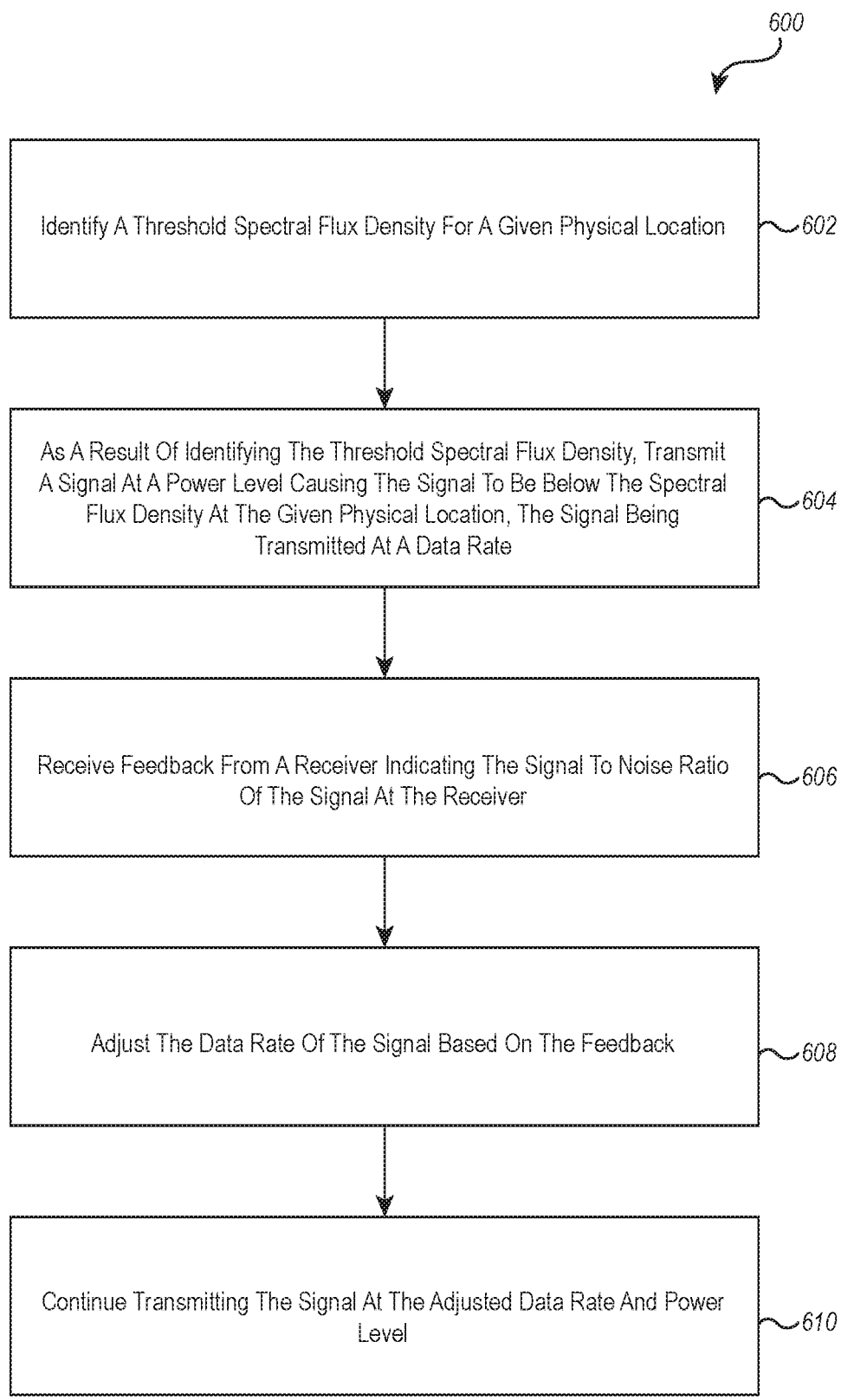
FIG. 6 illustrates a method of transmitting a signal from a transmitter.

Referring now to FIG. 6, a method 600 is illustrated. The method 600 includes acts for transmitting a signal from a transmitter.

The method 600 includes identifying a threshold spectral flux density for a given physical location (act 602). For example, as illustrated in FIG. 1, the transmitter 102 may obtain information about what the spectral flux density of a signal should be at the physical location 110.

The method 600 further includes, as a result of identifying the threshold spectral flux density, transmitting a signal at a power level causing the signal to be below the spectral flux density at the given physical location, the signal being transmitted at a data rate (act 604). For example, as illustrated in FIG. 1, the transmitter 102 transmits the signal 104 such that as it expands towards the physical location 110 the spectral flux density at the physical location 110 will be below a particular threshold for the spectral flux density. This threshold may be selected to ensure that the transmitter 102 remains undetectable, or at least has a low probability of detection, by the adversary 108.

The method 600 further includes, receiving feedback from a receiver indicating the signal-to-noise ratio of the signal at the receiver (act 606). For example, as illustrated in FIG. 1, the receiver 106 provides a feedback message 121 to the transmitter 102 indicating the signal-to-noise ratio of the signal 104 received at the receiver 106.

The method 600 further includes, adjusting the data rate of the signal based on the feedback (act 608). For example, the transmitter 102 in FIG. 1 will adjust the data rate of the signal 104 to adjust the signal-to-noise ratio for the signal 104 received by the receiver 106.

The method 600 further includes, continuing transmitting the signal at the adjusted data rate and power level (act 610).

The method 600 may be practiced where the feedback is used to determine that signal-to-noise ratio should be increased, and wherein adjusting the data rate of the signal comprises lowering the data rate of the signal. In particular, more energy per bit will exist when the data rate is lowered and therefore increase the signal-to-noise ratio.

The method 600 may be practiced where the feedback is used to determine that signal-to-noise ratio should be decreased, and wherein adjusting the data rate of the signal comprises raising the data rate of the signal. For example, it may be determined that the data rate can be increased, and still maintain a particular desired signal-to-noise ratio, such that more data can be transmitted from the transmitter 102 to the receiver 106.

Therefore, the data rate can be increased which will lower the signal-to-noise ratio, but not below a threshold signal-to-noise ratio required for communications between the transmitter 102 and receiver 106.

The method 600 may further include determining that the transmitter has moved closer to the given physical location and as a result, lowering the power level, causing the signal to remain below the spectral flux density at the given physical location. For example, in some embodiments, a determination can be made for the location of the transmitter 102, such as through the use of location hardware such as GPS, cellular triangulation, etc., and a determination can be made that the transmitter 102 has moved closer to the physical location 110. The power of the signal 104 would need to be reduced to maintain the desired spectral flux density at the physical location 110. Thus, when it can be determined that the transmitter 102 has moved closer to the physical location 110, then the power of the signal 104 can be reduced. Note that as used herein, the physical location 110 may actually be variable. That is, the adversary 108 may be mobile such that the physical location 110 associated with the adversary moves as the adversary moves. Thus, as used herein, determining that the transmitter has moved closer to the physical location may include determining that a static transmitter 102 is closer to the physical location 110 as a result of the physical location 110 changing. In alternative or additional embodiments, both the transmitter 102 and the adversary 108 may be mobile such that determinations may be made based on both the movements of the transmitter 102 and the adversary 108 to determine when power should be raised and/or lowered to maintain a particular spectral flux density at the physical location 110.

In this context, the method 600 may further include determining that the transmitter has moved further away from the given physical location, and as a result, limiting an amount the power level is raised to cause the signal to remain below the spectral flux density at the given physical location.

The method 600 may further include identifying a quality of service requirement for the receiver. Some such embodiments may further include determining that the quality of service experienced by the receiver for the signal is above the quality of service requirement. Some such embodiments may further include, as a result, lowering the power level of the signal causing the quality of service experienced by the receiver for the signal to move toward the quality of service requirement while still causing the quality of service experienced by the receiver to be above the quality of service requirement. For example, it may be desirable to transmit with as little power as possible to ensure covertness of the transmitter 102. However, there may be a quality of service requirement between the transmitter 102 and the receiver 106.

Determinations may be made that the quality of service can be maintained, even if the power of the signal 104 transmitted by the transmitter 102 is lowered. In these cases, the power can be lowered to a level that still maintains the required quality of service.

The method 600 may further include receiving feedback from a plurality of receivers where the feedback from each receiver in the plurality of receivers indicating the signal-to-noise ratio of the signal at that receiver. In some such embodiments, adjusting the data rate of the signal based on the feedback comprises adjusting the data rate to meet signal-to-noise ratio requirements for a receiver in the plurality of receivers experiencing the lowest signal-to-noise ratio, such that each of the receivers in the plurality of receivers receive the signal at a minimum required signal-to-noise ratio. Thus for example, there may be a number of different receivers in an environment where each of the different receivers provides a different feedback message indicating the signal-to-noise ratio for the signal 104 received at that particular receiver. In some embodiments, the data rate of the signal 104 may be adjusted based on the lowest signal-to-noise ratio reported from a receiver in the environment. Thus, while the signal 104 may be well above a certain signal-to-noise ratio for some receivers, it may be near or below a required signal-to-noise ratio for other receivers, resulting in the transmitter 102 reducing the data rate of the signal 104 for all receivers to ensure that the signal is able to be received by all receivers.

However, the method 600 may further include receiving feedback from a plurality of receivers where the feedback from each receiver in the plurality of receivers indicating the signal-to-noise ratio of the signal at that receiver. In some such embodiments, adjusting the data rate of the signal based on the feedback comprises adjusting the data rate to meet signal-to-noise ratio requirements for a receiver having higher priority than other lower priority receivers in the plurality of receivers such that the higher priority receiver receives the signal at a minimum required signal-to-noise ratio while one or more of the other lower priority receivers do not receive the signal at a minimum required signal-to-noise ratio. For example, it may be particularly important that certain receivers receive the signal 104 at a particular data rate such that it may be determined that other receivers will simply not be able to receive the signal 104. In some embodiments, this can be done for a limited predetermined period of time. Alternatively, or additionally, this may be done cyclically. Thus, for example, in some embodiments the signal 104 may be transmitted at a certain data rate where all receivers can receive the signal 104 for a period of time, and then during a different period of time the signal 104 may be transmitted at a higher data rate, resulting in a signal-to-noise ratio acceptable only for some receivers in the environment that require receiving data at higher data rates, while other receivers are unable to receive the signal.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of transmitting a signal from a transmitter to an intended receiver, the method comprising:
    identifying a threshold spectral flux density for a given physical location, remote from the transmitter and the intended receiver, and associated with an adversarial entity;
    as a result of identifying the threshold spectral flux density, transmitting a signal at a power level causing the signal to be below the spectral flux density at the given physical location, the signal being transmitted at a data rate;
    receiving feedback from a receiver indicating the signal-to-noise ratio of the signal at the receiver;
    adjusting the data rate of the signal based on the feedback; and
    continuing transmitting the signal at the adjusted data rate and power level so as to cause the signal to remain below the threshold spectral flux density at the physical location.

2. The method of claim 1, wherein the feedback is used to determine that signal-to-noise ratio should be increased, and wherein adjusting the data rate of the signal comprises lowering the data rate of the signal.

3. The method of claim 1, wherein the feedback is used to determine that signal-to-noise ratio should be decreased, and wherein adjusting the data rate of the signal comprises raising the data rate of the signal.

4. The method of claim 1, further comprising:
    determining that the transmitter has moved closer to the given physical location; and
    as a result, lowering the power level, causing the signal to remain below the spectral flux density at the given physical location.

5. The method of claim 1, further comprising:
    determining that the transmitter has moved further away from the given physical location; and
    as a result, limiting an amount the power level is raised to cause the signal to remain below the spectral flux density at the given physical location.

6. The method of claim 1, further comprising:
    identifying a quality of service requirement for the receiver;
    determining that the quality of service experienced by the receiver for the signal is above the quality of service requirement; and
    as a result, lowering the power level of the signal causing the quality of service experienced by the receiver for the signal to move toward the quality of service requirement while still causing the quality of service experienced by the receiver to be above the quality of service requirement.

7. The method of claim 1, further comprising:
    receiving feedback from a plurality of receivers, the feedback from each receiver in the plurality of receivers indicating the signal-to-noise ratio of the signal at that receiver; and
    wherein adjusting the data rate of the signal based on the feedback comprises adjusting the data rate to meet signal-to-noise ratio requirements for a receiver in the plurality of receivers experiencing the lowest signal-to-noise ratio, such that each of the receivers in the plurality of receivers receive the signal at a minimum required signal-to-noise ratio.

8. The method of claim 1, further comprising:
    receiving feedback from a plurality of receivers, the feedback from each receiver in the plurality of receivers indicating the signal-to-noise ratio of the signal at that receiver; and
    wherein adjusting the data rate of the signal based on the feedback comprises adjusting the data rate to meet signal-to-noise ratio requirements for a receiver having higher priority than other lower priority receivers in the plurality of receivers such that the higher priority receiver receives the signal at a minimum required signal-to-noise ratio while one or more of the other lower priority receivers do not receive the signal at a minimum required signal-to-noise ratio.

9. A system comprising:
    one or more processors; and
    one or more computer-readable media having stored thereon instructions that are executable by the one or more processors to configure the system to transmit a signal from a transmitter to an intended receiver, including instructions that are executable to configure the system to perform at least the following:
        identifying a threshold spectral flux density for a given physical location, remote from the transmitter and the intended receiver, and associated with an adversarial entity;
        as a result of identifying the threshold spectral flux density, transmitting a signal at a power level causing the signal to be below the spectral flux density at the given physical location, the signal being transmitted at a data rate;
        receiving feedback from a receiver indicating the signal-to-noise ratio of the signal at the receiver;
        adjusting the data rate of the signal based on the feedback; and
        continuing transmitting the signal at the adjusted data rate and power level so as to cause the signal to remain below the threshold spectral flux density at the physical location.

10. The system of claim 9, wherein the feedback is used to determine that signal-to-noise ratio should be increased, and wherein adjusting the data rate of the signal comprises lowering the data rate of the signal.

11. The system of claim 9, wherein the feedback is used to determine that signal-to-noise ratio should be decreased, and wherein adjusting the data rate of the signal comprises raising the data rate of the signal.

12. The system of claim 9, wherein the one or more computer-readable media further have stored thereon instructions that are executable by the one or more processors to configure the system to perform at least the following:
    determining that the transmitter has moved closer to the given physical location; and as a result, lowering the power level, causing the signal to remain below the spectral flux density at the given physical location.

13. The system of claim 9, wherein the one or more computer-readable media further have stored thereon instructions that are executable by the one or more processors to configure the system to perform at least the following:

determining that the transmitter has moved further away from the given physical location; and as a result, limiting an amount the power level is raised to cause the signal to remain below the spectral flux density at the given physical location.

14. The system of claim 9, wherein the one or more computer-readable media further have stored thereon instructions that are executable by the one or more processors to configure the system to perform at least the following:

identifying a quality of service requirement for the receiver;

determining that the quality of service experienced by the receiver for the signal is above the quality of service requirement; and as a result, lowering the power level of the signal causing the quality of service experienced by the receiver for the signal to move toward the quality of service requirement while still causing the quality of service experienced by the receiver to be above the quality of service requirement.

15. The system of claim 9, wherein the one or more computer-readable media further have stored thereon instructions that are executable by the one or more processors to configure the system to perform at least the following:

receiving feedback from a plurality of receivers, the feedback from each receiver in the plurality of receivers indicating the signal-to-noise ratio of the signal at that receiver; and wherein adjusting the data rate of the signal based on the feedback comprises adjusting the data rate to meet signal-to-noise ratio requirements for a receiver in the plurality of receivers experiencing the lowest signal-to-noise ratio, such that each of the receivers in the plurality of receivers receive the signal at a minimum required signal-to-noise ratio.

16. The system of claim 9, wherein the one or more computer-readable media further have stored thereon instructions that are executable by the one or more processors to configure the system to perform at least the following:

receiving feedback from a plurality of receivers, the feedback from each receiver in the plurality of receivers indicating the signal-to-noise ratio of the signal at that receiver; and wherein adjusting the data rate of the signal based on the feedback comprises adjusting the data rate to meet signal-to-noise ratio requirements for a receiver having higher priority than other lower priority receivers in the plurality of receivers such that the higher priority receiver receives the signal at a minimum required signal-to-noise ratio while one or more of the other lower priority receivers do not receive the signal at a minimum required signal-to-noise ratio.

17. A transmitter for transmitting a signal to an intended receiver, the transmitter comprising:

communication hardware configured to transmit a signal at a power level configured to cause the signal to be below a predetermined spectral flux density at a given physical location, remote from the transmitter and the intended receiver, and associated with an adversarial entity, the signal being transmitted at a data rate; and a rate controller configured to:

receive feedback from a receiver indicating a signal-to-noise ratio of the signal at the receiver; and adjust the data rate of the signal based on the feedback such that the communication hardware continues to transmit the signal at the adjusted data rate and power level so as to cause the signal to remain below the threshold spectral flux density at the physical location.

18. The transmitter of claim 17, wherein the feedback is used to determine that signal-to-noise ratio should be increased, and wherein adjusting the data rate of the signal comprises lowering the data rate of the signal.

19. The transmitter of claim 17, wherein the feedback is used to determine that signal-to-noise ratio should be decreased, and wherein adjusting the data rate of the signal comprises raising the data rate of the signal.

20. The transmitter of claim 17, wherein the transmitter is configured to:

identify a quality of service requirement for the receiver;

determine that the quality of service experienced by the receiver for the signal is above the quality of service requirement; and as a result, lower the power level of the signal transmitted by the communication hardware causing the quality of service experienced by the receiver for the signal to move toward the quality of service requirement while still causing the quality of service experienced by the receiver to be above the quality of service requirement.

* * * * *